United States Patent
Saboune et al.

(10) Patent No.: US 9,898,085 B2
(45) Date of Patent: Feb. 20, 2018

(54) HAPTIC CONVERSION SYSTEM USING SEGMENTING AND COMBINING

(71) Applicant: Immersion Corporation, San Jose, CA (US)

(72) Inventors: Jamal Saboune, Montreal (CA); Juan Manuel Cruz-Hernandez, Montreal (CA); Satvir Singh Bhatia, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 107 days.

(21) Appl. No.: 14/020,461

(22) Filed: Sep. 6, 2013

(65) Prior Publication Data
US 2015/0070260 A1 Mar. 12, 2015

(51) Int. Cl.
| G09G 5/00 | (2006.01) |
| G06F 3/033 | (2013.01) |
| G09G 5/08 | (2006.01) |
| G06F 3/045 | (2006.01) |
| G06F 3/01 | (2006.01) |
| G10L 21/16 | (2013.01) |

(52) U.S. Cl.
CPC .............. G06F 3/016 (2013.01); G10L 21/16 (2013.01)

(58) Field of Classification Search
CPC ...... G06F 3/016; G06F 1/1626; G06F 1/1656; G06F 2200/1633
See application file for complete search history.

(56) References Cited

U.S. PATENT DOCUMENTS

| 5,684,722 | A | 11/1997 | Thorner et al. |
| 7,979,146 | B2 | 7/2011 | Ullrich et al. |
| 8,000,825 | B2 | 8/2011 | Ullrich et al. |
| 8,378,964 | B2 | 2/2013 | Ullrich et al. |
| 8,502,679 | B2 | 8/2013 | Ayon et al. |
| 9,196,134 | B2 | 11/2015 | Levesque et al. |
| 2003/0067440 | A1* | 4/2003 | Rank ............................ 345/156 |
| 2003/0068053 | A1* | 4/2003 | Chu .............................. 381/118 |
| 2004/0138769 | A1* | 7/2004 | Akiho ............................ 700/94 |
| 2004/0150650 | A1* | 8/2004 | Mendelson ............ G09G 5/005 345/589 |
| 2007/0242040 | A1* | 10/2007 | Ullrich .................... G10L 21/06 345/157 |
| 2007/0285216 | A1 | 12/2007 | Tierling et al. |

(Continued)

FOREIGN PATENT DOCUMENTS

| JP | 2003099177 A | 4/2003 |
| WO | 9914986 A1 | 3/1999 |

(Continued)

OTHER PUBLICATIONS

Henry Da Costa, U.S. Appl. No. 13/439,241, filed Apr. 4, 2012.
Satvir Singh Bhatia, U.S. Appl. No. 13/661,140, filed Oct. 26, 2012.
Christopher J. Ullrich, U.S. Appl. No. 13/785,166, filed Mar. 5, 2013.

(Continued)

*Primary Examiner* — Nan-Ying Yang
(74) *Attorney, Agent, or Firm* — Miles & Stockbridge P.C.

(57) ABSTRACT

A system is provided that converts an input into one or more haptic effects using segmenting and combining. The system receives an input. The system further segments the input into a plurality of input sub-signals. The system further converts the plurality of input sub-signals into a haptic signal. The system further generates the one or more haptic effects based on the haptic signal.

27 Claims, 7 Drawing Sheets

(56) References Cited

U.S. PATENT DOCUMENTS

| | | |
|---|---|---|
| 2009/0231276 A1 | 9/2009 | Ullrich et al. |
| 2010/0066512 A1 | 3/2010 | Rank |
| 2011/0029041 A1* | 2/2011 | Wiskerke ............. H04R 25/606 607/57 |
| 2011/0115709 A1* | 5/2011 | Cruz-Hernandez ........... 345/168 |
| 2011/0202155 A1 | 8/2011 | Ullrich et al. |
| 2011/0215913 A1 | 9/2011 | Ullrich et al. |
| 2012/0206246 A1 | 8/2012 | Cruz-Hernandez et al. |
| 2012/0206247 A1 | 8/2012 | Bhatia et al. |
| 2012/0306631 A1 | 12/2012 | Hughes |
| 2013/0131851 A1 | 5/2013 | Ullrich et al. |
| 2013/0207917 A1 | 8/2013 | Cruz-Hernandez et al. |
| 2014/0176415 A1 | 6/2014 | Buuck et al. |

FOREIGN PATENT DOCUMENTS

| | | |
|---|---|---|
| WO | 03032289 A1 | 4/2003 |
| WO | 2008127316 A1 | 10/2008 |

OTHER PUBLICATIONS

Christopher J. Ullrich, U.S. Appl. No. 13/788,487, filed Mar. 7, 2013.

Juan Manuel Cruz-Hernandez, U.S. Appl. No. 13/803,778, filed Mar. 14, 2013.

Juan Manuel Cruz-Hernandez, U.S. Appl. No. 13/799,059, filed Mar. 13, 2013.

Jamal Saboune et al., U.S. Appl. No. 14/020,502, filed Sep. 6, 2013.

Amaya Becvar Weddle et al., U.S. Appl. No. 14/019,606, filed Sep. 6, 2013.

Jong-Uk Lee et al., "Haptic interaction with user manipulation for smartphone", Consumer Electronics (ICCE), 2013 IEEE International Conference on, IEEE, Jan. 11, 2013, pp. 47-48, XP032348660.

Jaebong Lee et al., "Real-time perception-level translation from audio signals to vibrotactile effects", Human factors in computing systems, Apr. 27, 2013, pp. 2567-2576, XP058043430.

* cited by examiner

HAPTIC CONVERSION SYSTEM USING SEGMENTING AND COMBINING

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of haptic effects with the output of other content, such as audio, so that the haptic effects are incorporated into the other content. For example, an audio effect developer can develop audio effects that can be output by the device, such as machine gun fire, explosions, or car crashes. Further, other types of content, such as video effects, can be developed and subsequently output by the device. A haptic effect developer can subsequently author a haptic effect for the device, and the device can be configured to output the haptic effect along with the other content. However, such a process generally requires the individual judgment of the haptic effect developer to author a haptic effect that correctly compliments the audio effect, or other type of content. A poorly-authored haptic effect that does not compliment the audio effect, or other type of content, can produce an overall dissonant effect where the haptic effect does not "mesh" with the audio effect or other content. This type of user experience is generally not desired.

SUMMARY

One embodiment is a system that converts an input into one or more haptic effects using segmenting and combining. The system receives an input. The system further segments the input into a plurality of input sub-signals. The system further converts the plurality of input sub-signals into a single haptic signal, or multiple haptic signals that can either be played separately on different haptic output devices, or mixed into a single haptic signal. The system further generates the one or more haptic effects based on the haptic signal.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a system that can convert an input, such as an audio signal, into a haptic signal that can be used to generate haptic effects. The system can filter the input into multiple frequency bands, where each frequency band includes a sub-signal of the input, and the system can further prioritize the multiple frequency bands based on one or more parameters of analysis. In general, the system can create a prioritized list of the frequency bands. The system can further select one or more frequency bands from the prioritized list, and use the selected frequency band(s) to generate the haptic signal, where the haptic signal is based upon, at least in part, a combination of the selected frequency band(s). For example, the system can band-pass filter an audio signal into four frequency bands, and can create a haptic signal based on the frequency band that contains an audio sub-signal with the highest magnitude. The haptic conversion functionality of the system can be implemented either as offline functionality that provides an output file that can be played back on a device, or as an algorithm that performs the processing at playback time.

Another embodiment is a system that can convert an input, such as an audio signal, into a haptic signal that can be used to generate haptic effects. The system can read a multimedia file (e.g., audio file or video file), and extract an input signal, such as an audio signal, from the multimedia file. The system can filter the input signal into one or more input sub-signals. For example, the system can use different band pass filters with complementary cutoff frequencies to segment the input signal into different complementary input sub-signals. The system can then create a haptic sub-signal for each input sub-signal. The system can further mix, or otherwise combine, the haptic sub-signals into an overall haptic signal that corresponds to the original input signal. The haptic conversion functionality of the system can be implemented as a software module, a mobile application, or a plug-in for audio/video players and editing tools.

Figure 1:
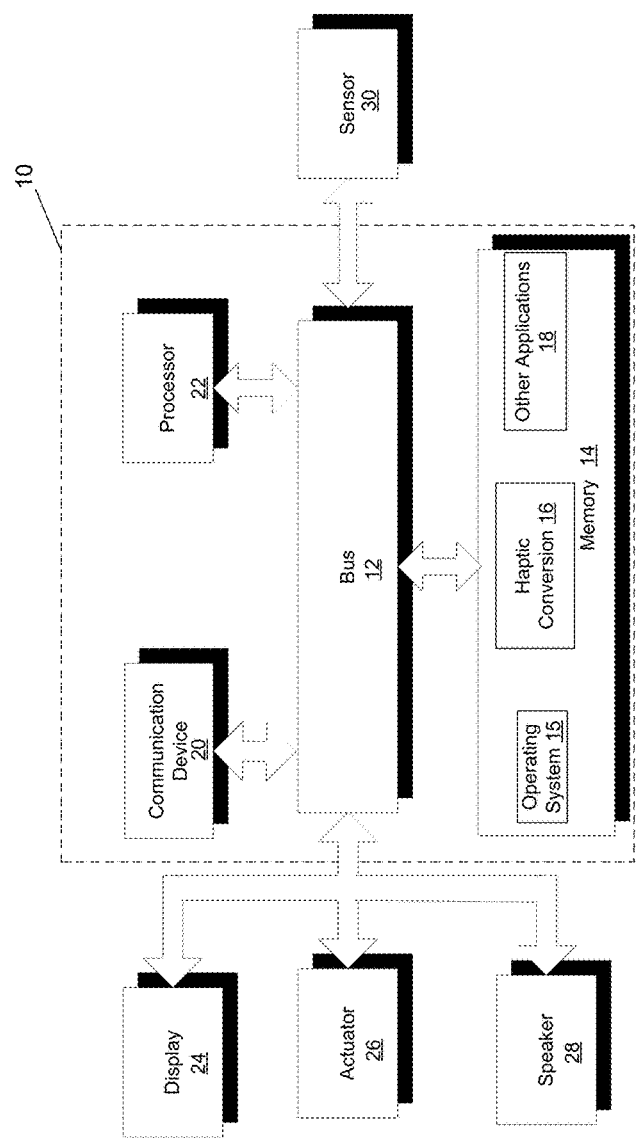
FIG. 1 illustrates a block diagram of a system in accordance with one embodiment of the invention.

FIG. 1 illustrates a block diagram of a system 10 in accordance with one embodiment of the invention. In one embodiment, system 10 is part of a mobile device, and system 10 provides a haptic conversion functionality for the mobile device. In another embodiment, system 10 is part of a wearable device, and system 10 provides a haptic conversion functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides the haptic conversion functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic conversion module 16 that converts an input into one or more haptic effects using segmenting and combining, as disclosed in more detail below. In certain embodiments, haptic conversion module 16 can comprise a plurality of modules, where each module provides specific individual functionality for converting an input into one or more haptic effects using segmenting and combining. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electromagnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, system 10 can include one or more additional sensors, in addition to sensor 30 (not illustrated in FIG. 1). In some of these embodiments, sensor 30 and the one or more additional sensors may be part of a sensor array, or some other type of collection of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device can then send the converted signal to system 10 through communication device 20.

Figure 2:
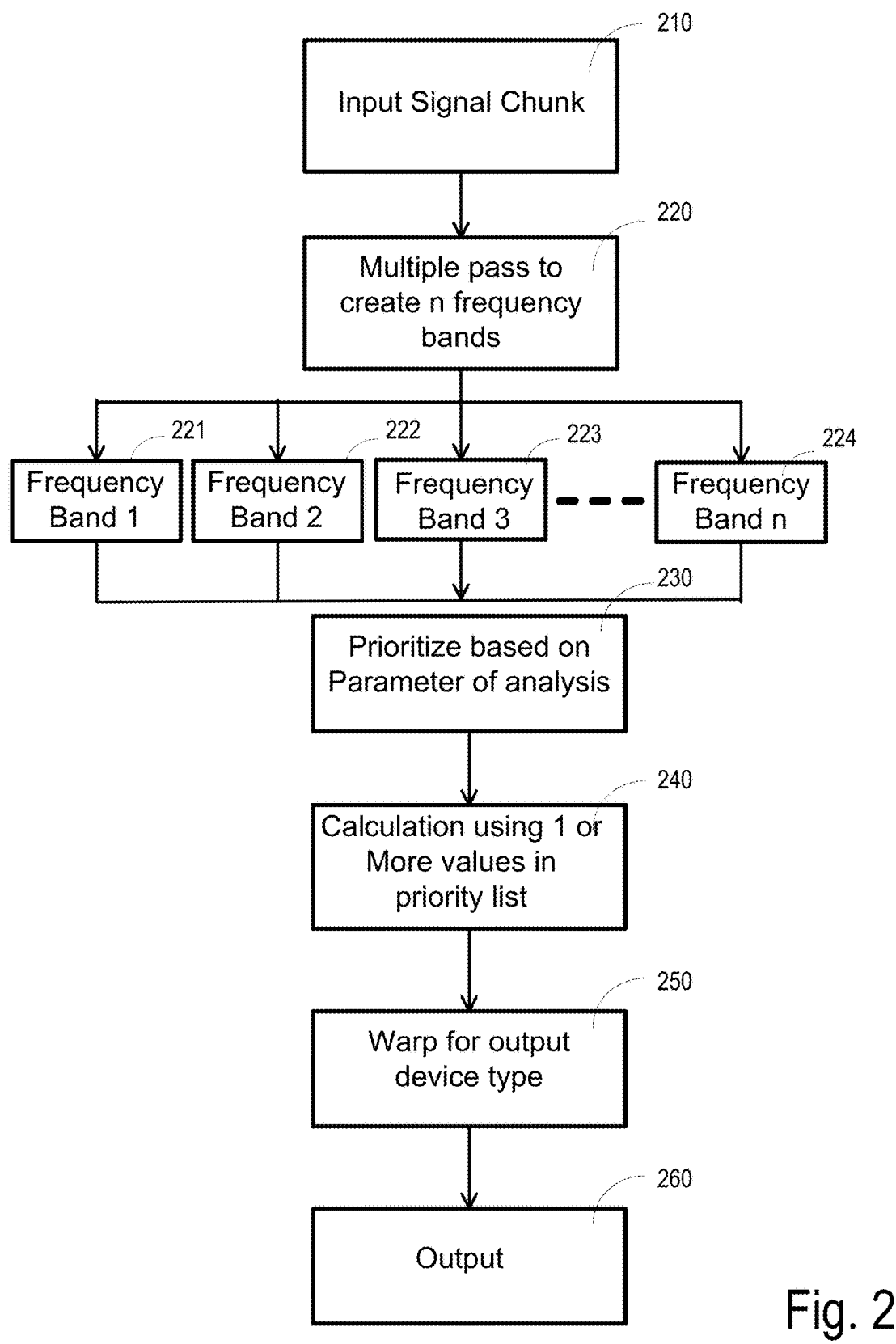
FIG. 2 illustrates a flow diagram of haptic conversion functionality performed by a system, according to an embodiment of the invention.
Figure 7:
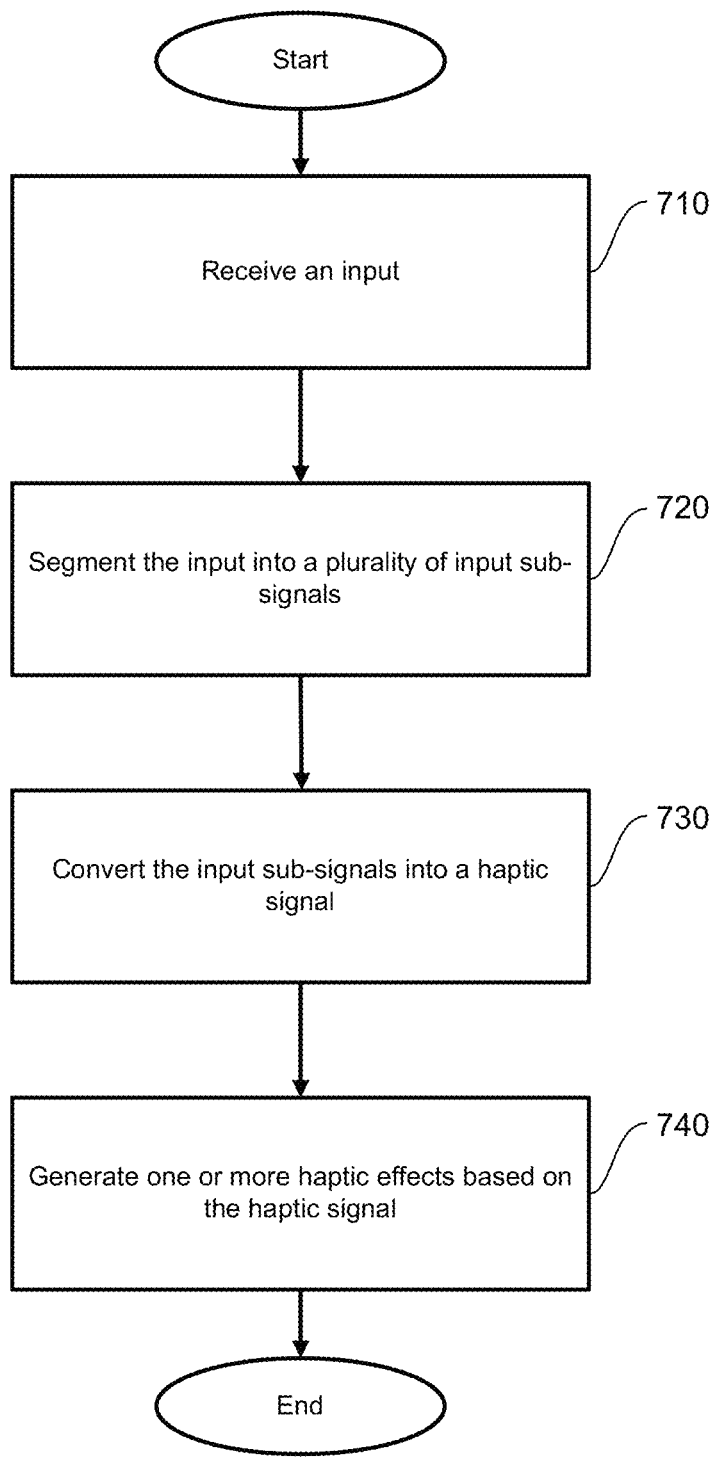
FIG. 7 illustrates a flow diagram of the functionality of a haptic conversion module, according to an embodiment of the invention.

FIG. 2 illustrates a flow diagram of haptic conversion functionality performed by a system, according to an embodiment of the invention. In one embodiment, the functionality of FIG. 2, as well as the functionality of FIG. 4 and the functionality of FIG. 7, are each implemented by software stored in memory or other computer-readable or tangible media, and executed by a processor. In this embodiment, each functionality may be performed by a haptic conversion module (such as haptic conversion module 16 of FIG. 1). In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The haptic conversion functionality can include receiving one or more "chunks" (also identified as segments) of an input signal, processing each chunk of the input signal, and playing back the modified chunk of the input signal on a haptic output device, such as an actuator. In certain embodiments, the input can be an audio signal, or other type of audio input, that includes audio data. In other alternate embodiments, the input can be a video signal, or other type of video input, that includes video data. In yet other alternate embodiments, the input can be an acceleration signal, or other type of acceleration input, that includes acceleration data. In yet other alternate embodiments, the input can be an orientation signal that includes orientation data, an ambient light signal that includes ambient light data, or another type of signal that can be related to a media file, and that can also be sensed by a sensor, such as sensor 30. The output of the sensor can be recorded beforehand, and can be provided along with the media file. Thus, the sensor may be, or may not be, attached to the system.

According to the embodiment, the flow begins at 210, where an input signal chunk is received. As previously described, an input signal chunk is a segment of an input signal. In one embodiment, the input signal chunk can include the entire input signal. The flow proceeds to 220.

At 220, the input signal chunk is filtered (e.g., band-pass filtered) to create a plurality of input sub-signals (also identified as frequency bands). More specifically, one or more filters (e.g., band-pass filters) can be applied to the input signal chunk to remove segments of the input signal chunk, so that the remaining segment of the input signal chunk includes one or more frequencies within a specific frequency band. The segment of the input signal chunk that remains after the application of the filter is identified as an input sub-signal, or a frequency band. In embodiments involving a plurality of filters, each filter can correspond to a specific frequency band, the plurality of filters can be applied to the input signal chunk in multiple passes (where a different filter is applied to the input signal chunk in each pass), and each filter can create a segment of the input signal chunk that includes one or more frequencies within a frequency band that corresponds to the filter. In certain embodiments, an input sub-signal can include the entire input signal chunk.

For example, a first filter can represent a low frequency band, a second filter can represent a medium frequency band, and a third filter can represent a high frequency band. A first filter can be applied to an input signal chunk, and a first input sub-signal can be created, where the first input sub-signal includes one or more frequencies within a low frequency band. A second filter can then be applied to the input signal chunk, and a second input sub-signal can be created, where the second input sub-signal includes one or more frequencies within a medium frequency band. A third filter can then be applied to an input signal chunk, and a third input sub-signal can be created, where the third input sub-signal includes one or more frequencies within a high frequency band.

The input sub-signals (i.e., frequency bands) that are created at 220 are illustrated in FIG. 2 as frequency bands 221, 222, 223, and 224. However, any number of input sub-signals can be created, and each input sub-signal can be defined to include one or more frequencies within any type of frequency band. An example implementation of input sub-signals is further described below in conjunction with FIG. 3. The flow then proceeds to 230.

At 230, the input sub-signals (e.g., frequency bands 221-224) are prioritized based on an analysis parameter. More specifically, one or more characteristics of each input sub-signal are analyzed, where the analysis parameter defines the one or more characteristics. Examples of the characteristics can include: frequency, duration, envelope, density, and magnitude. The input sub-signals can then be ordered (i.e., prioritized) based on the analyzed characteristics of each input sub-signal. For example, a prioritized list of the one or more input sub-signals can be generated, where the one or more input sub-signals are prioritized within the list based on the analyzed characteristics of each input sub-signal.

As an example, an analysis parameter can be defined as a magnitude of an input sub-signal. A plurality of input sub-signals (i.e., frequency bands) can be created, and each input sub-signal can be analyzed in order to determine a maximum magnitude value. The maximum magnitude value for each input sub-signal can be compared, and the input sub-signals can be prioritized based on the corresponding maximum magnitude values.

An example implementation of analyzing and prioritizing input sub-signals using an analysis parameter is further described below in conjunction with FIG. 3. The flow then proceeds to 240.

At 240, a haptic signal is calculated and generated based on one or more input sub-signals that are selected from the prioritized input sub-signals. More specifically, one or more input sub-signals are first selected from the prioritized input sub-signals. For example, an input sub-signal with the highest priority (or a plurality of input sub-signals with the highest priorities) can be selected from a prioritized list of the input sub-signals. Subsequently, a haptic signal is calculated based on the selected input sub-signal(s). More specifically, the haptic signal is calculated to include one or more characteristics of the selected input sub-signal(s). In certain embodiments, the haptic signal can be calculated to include all the characteristics of the selected input sub-signal(s). In embodiments where there are a plurality of input sub-signals, the haptic signal can be calculated, at least in part, based on a combination of the input sub-signals. The haptic signal is subsequently generated.

As an example, an input sub-signal with a highest maximum magnitude value can be selected. The maximum magnitude value of the input sub-signal can be used to calculate a haptic signal. This haptic signal can subsequently be used to generate a haptic effect that is based on the input sub-signal with the highest magnitude. As another example, the three input sub-signals with the three highest maximum magnitude values can be selected. The maximum magnitude values of the three input sub-signals can be used to calculate a haptic signal. For example, an average, or other calculation, of the three maximum magnitude values can be calculated. This average value, or other calculated value, can be used to generate a haptic signal. This haptic signal can subsequently be used to generate a haptic effect that is based on the three input sub-signals with the three highest magnitudes. The flow then proceeds to 250.

At 250, the generated haptic signal is "warped" into a "warped haptic signal." More specifically, the generated haptic signal is input into a "warping" function, where a warping function can "warp" or transform the data contained within an input signal to create an output signal, where the output signal is also identified as a "warped signal." Thus, by inputting the generated haptic signal into the warping function, the warping function can warp the data contained within the generated haptic signal. The warping of the data contained within the generated haptic signal can ultimately transform the generated haptic signal into the "warped haptic signal." In certain embodiments, the warped haptic signal is more suitable for a specific haptic output device, and thus, the warped haptic signal can be played on the specific haptic output device in order to generate one or more haptic effects.

In one example, for an LRA or an ERM, the warping function can envelope an input haptic signal, or use a maximum magnitude value of the input haptic signal, to calculate a magnitude of an output haptic signal that is generated, where the magnitude of the output haptic signal correlates to the magnitude of a haptic effect generated by the output haptic signal. In another example, for a piezoelectric actuator, a high bandwidth actuator, or an EAP actuator, the warping function can play back the input haptic signal as a waveform, or perform another type of algorithm to convert the input haptic signal into an output haptic signal.

In certain embodiments, 250 can be omitted. The flow then proceeds to 260.

At 260, the haptic signal (either the warped haptic signal if 250 is performed, or the generated haptic signal if 250 is omitted) is sent to a haptic output device, such as actuator 26 of FIG. 1, and the haptic output device generates one or more haptic effects based on the haptic signal. Thus, the one or more haptic effects can be generated based on the selected input sub-signal(s). The flow then ends.

In certain embodiments, the haptic conversion functionality illustrated in FIG. 2 can be performed in real-time on a device configured to output haptic effects, such as a mobile device or touchscreen device. In other alternate embodiments, the haptic conversion functionality illustrated in FIG. 2 can be performed offline, by a computer or other type of computing machine, and a resulting haptic signal can be sent to the device that is configured to output the haptic effects.

Figure 3:
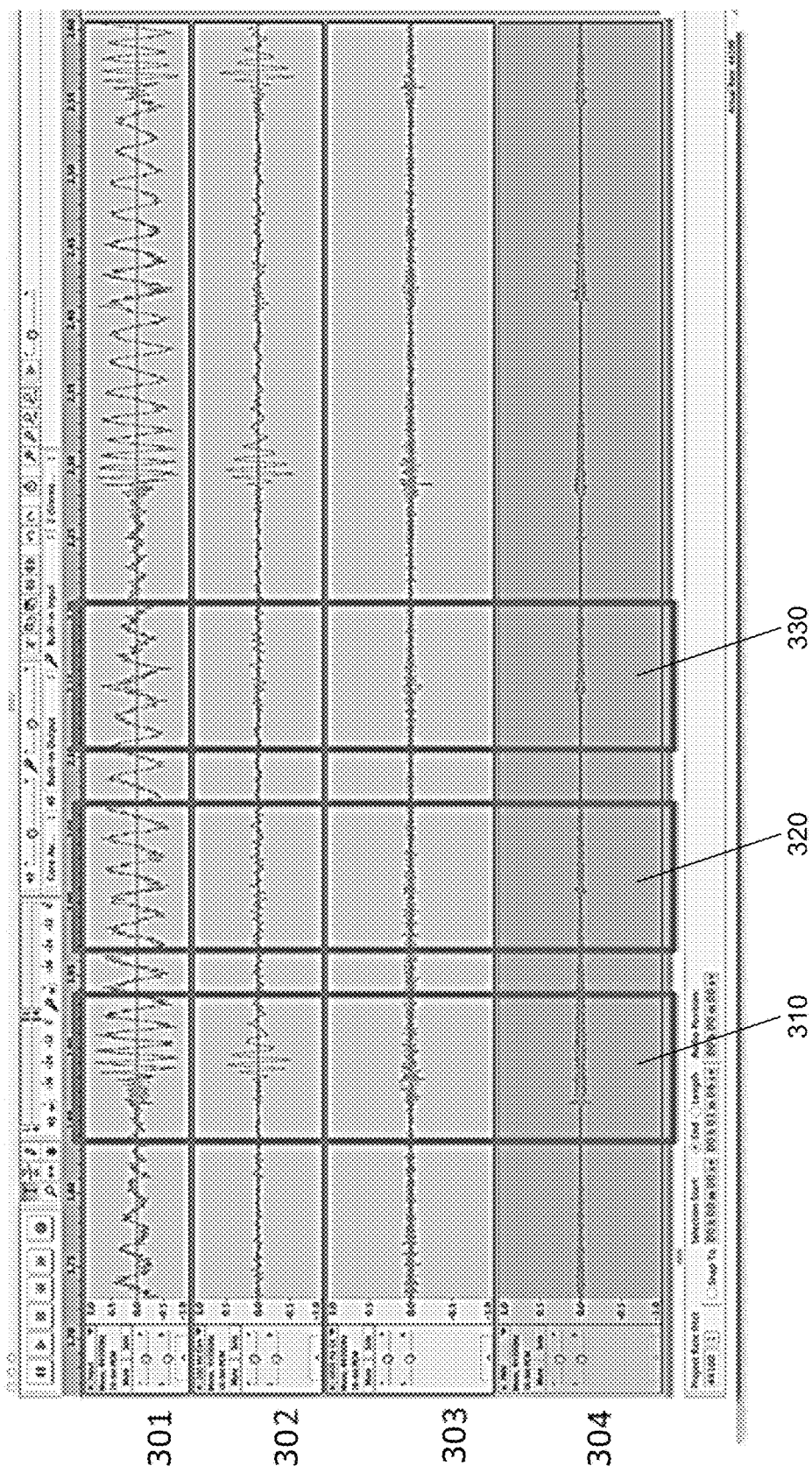
FIG. 3 illustrates a plurality of input sub-signals that are analyzed and converted into one or more haptic effects using frequency band analysis and prioritization, according to an embodiment of the invention.

FIG. 3 illustrates a plurality of input sub-signals that are analyzed and converted into one or more haptic effects using frequency band analysis and prioritization, according to an embodiment of the invention. As previously described, an input signal 301 can be filtered to create a plurality of input sub-signals using one or more filters, where the plurality of input sub-signals includes input sub-signals 302, 303, and 304. Input sub-signal 302 represents a 200 Hz center frequency band-pass of an input signal, and can be created using a first filter. Input sub-signal 303 represents a 1000 Hz center frequency band-pass of an input signal, and can be created using a second filter. Input sub-signal 304 represents a 5000 Hz center frequency band-pass of an input signal, and can be created using a third filter.

According to the embodiment, each input sub-signal can divided into a plurality of segments or windows. In the illustrated embodiment, example windows 310, 320, and 330 are illustrated, where windows 310, 320, and 330 each include a segment of input sub-signals 302, 303, and 304. In alternate embodiments, an input sub-signal can include other windows not illustrated in FIG. 3. Further, in certain embodiments, the windows of an input sub-signal can be in a sequential arrangement, where a subsequent window starts at a position when a preceding window ends.

According to the embodiment, for each window, one or more characteristics of each input sub-signal can be analyzed based on an analysis parameter. Thus, in the illustrated embodiment, for each window of windows 310, 320, and 330, one or more audio characteristics of input sub-signal 302 can be analyzed based on an analysis parameter. Likewise, for each window of windows 310, 320, and 330, one or more audio characteristics of input sub-signals 303 and 304 can also be analyzed based on an analysis parameter. For each window of windows 310, 320, and 330, input sub-signals 302, 303, and 304 can be prioritized based on the analysis. Further, for each window of windows 310, 320, and 330, an input sub-signal can be selected from input sub-signals 302, 303, and 304 based on the prioritization, and the selected input sub-signal can be converted into a haptic signal. Examples of analysis parameters can include: frequency, duration, envelope, density, and magnitude.

In one example, an analysis parameter can be a magnitude. In this example, for window 310, the magnitude of input sub-signals 302, 303, and 304 can be analyzed. Further, for window 310, input sub-signal 302 can be selected because input sub-signal 302 has the highest magnitude. Input sub-signal 302 can subsequently be used to generate a haptic signal for window 310. Likewise, for window 320, the magnitude of input sub-signals 302, 303, and 304 can be analyzed. Further, for window 320, input sub-signal 302 can be selected because input sub-signal 302 has the highest magnitude. Input sub-signal 302 can subsequently be used to generate a haptic signal for window 320. Similarly, for window 330, the magnitude of input sub-signals 302, 303, and 304 can be analyzed. Further, for window 330, input sub-signal 303 can be selected because input sub-signal 303 has the highest magnitude. Input sub-signal 303 can subsequently be used to generate a haptic signal for window 330.

In one example, an analysis parameter can be a density. In one embodiment, a density can be a power, or energy, of a signal, distributed over the different frequencies of the signal. In this example, for window 310, the density of input sub-signals 302, 303, and 304 can be analyzed. Further, for window 310, input sub-signal 304 can be selected because input sub-signal 304 has the highest density. Input sub-signal 304 can subsequently be used to generate a haptic signal for window 310. Likewise, for window 320, the density of input sub-signals 302, 303, and 304 can be analyzed. Further, for window 320, input sub-signal 304 can be selected because input sub-signal 304 has the highest density. Input sub-signal 304 can subsequently be used to generate a haptic signal for window 320. Similarly, for window 330, the density of input sub-signals 302, 303, and 304 can be analyzed. Further, for window 330, input sub-signal 303 can be selected because input sub-signal 303 has the highest density. Input sub-signal 303 can subsequently be used to generate a haptic signal for window 330.

Figure 4:
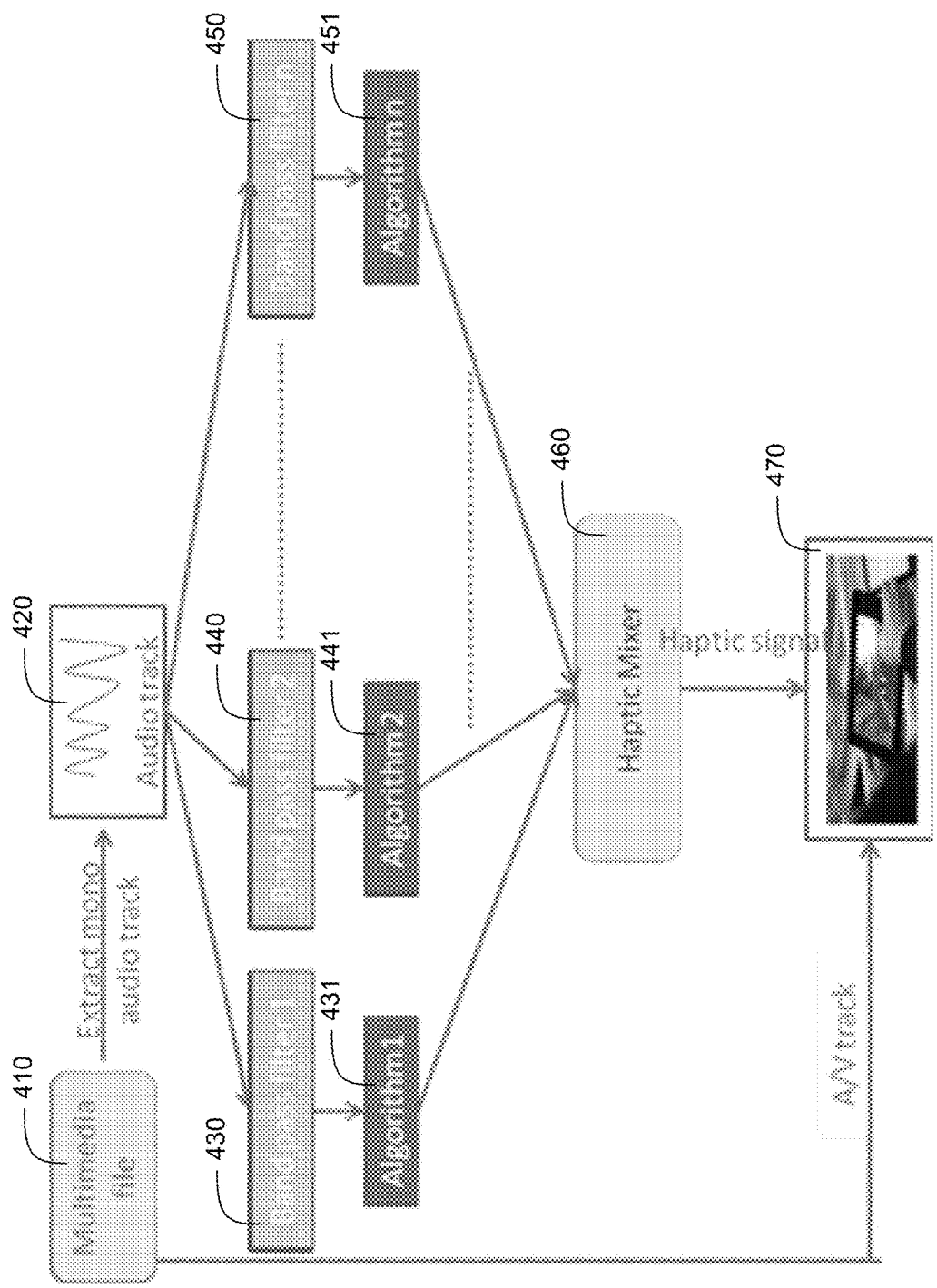
FIG. 4 illustrates a flow diagram of haptic conversion functionality performed by a system, according to another embodiment of the invention.

FIG. 4 illustrates a flow diagram of haptic conversion functionality performed by a system, according to another embodiment of the invention. According to an embodiment, the haptic conversion functionality can be performed by a software program or algorithm that receives a multimedia file, such as an audio file or video file, as input, and generates a haptic signal as output. The software program or algorithm can be a stand-alone software program, a mobile application, or a plug-in for other audio/video editing tools, such as ProTools. In another embodiment, the haptic conversion functionality can be performed by a multimedia player that receives a multimedia file and outputs the content of the multimedia file, where the content is augmented with one or more haptic effects. The multimedia player can be adjusted for mobile devices or computers. In one embodiment, the functionality may be performed by a haptic conversion module (such as haptic conversion module 16 of FIG. 1).

According to the embodiment, the flow begins, and multimedia file 410 is received. Multimedia file 410 is any computer file that includes multimedia data. In one example embodiment, multimedia file 410 is a computer file that includes audio data. In another example embodiment, multimedia file 410 is a computer file that includes video data. In another example embodiment, multimedia file 410 is a computer file that includes both audio and video data. In yet another example embodiment, multimedia file 410 is a computer file that includes some other type of data. Multimedia file 410 can be streamed online or provided on a physical digital support, such as a memory, disk, or other type of non-transitory computer-readable medium. Audio signal 420 (identified in FIG. 4 as audio track 420) is then extracted from multimedia file 410. Audio signal 420 is an example of an input signal that can be extracted from multimedia file 410. In alternate embodiments, audio signal 420 can be replaced by another type of input signal, such as a video signal, an acceleration signal, an orientation signal, an ambient light signal, or another type of signal that can include data captured with a sensor.

Audio signal 420 is subsequently filtered (e.g., band-pass filtered) to create a plurality of audio sub-signals, where an audio sub-signal is a type of input sub-signal (i.e., frequency band). More specifically, one or more filters (e.g., band-pass filters) can be applied to audio signal 420 to remove segments of audio signal 420, so that the remaining segment of audio signal 420 includes one or more frequencies within a specific frequency band. The segment of audio signal 420 that remains after the application of the filter is identified as an audio sub-signal. In embodiments involving a plurality of filters, each filter can correspond to a specific frequency band, the plurality of filters can be applied to audio signal 420 in multiple passes (where a different filter is applied to audio signal 420 in each pass), and each filter can create a segment of audio signal 420 that includes one or more frequencies within a frequency band that corresponds to the filter. In the illustrated embodiments, the one or more filters are represented by band pass filters 430, 440, and 450. However, any number of filters can be used. Further, any type of filter can be used. In certain embodiments, an audio sub-signal can include the entirety of audio signal 420.

In certain embodiments, the choice of cutoff frequencies that are defined for each filter can be done in a way to have contiguous complementary input sub-signals (i.e., frequency bands) that cover most or all of the frequencies present in the original input signal. The choice of the number and bandwidths of the different filters can be relative to the nature of the input signal (e.g., audio signal 420), and can affect the creation of a haptic signal. In some embodiments, the resonant frequency of a haptic output device can be used to define the number and bandwidths of the filters. For example, three filters can be used to produce three input sub-signals, where the first input sub-signal includes content with frequencies lower than the resonant frequency of the haptic output device, the second input sub-signal includes content with frequencies around the resonant frequency of the haptic output device, and the third input sub-signal includes content with frequencies greater than the resonant frequency of the haptic output device.

Next, audio sub-signals, or other types of input sub-signals, are converted into haptic sub-signals using a plurality of haptic conversion algorithms. In the illustrated embodiments, the haptic conversion algorithms are represented by algorithms 431, 441, and 451. However, any number of haptic conversion algorithms can be used. In certain embodiments, each audio sub-signal is converted into a haptic signal using a unique haptic conversion algorithm. Thus, the plurality of haptic conversion algorithms can covert the plurality of audio sub-signals, or other types of input sub-signals, into a plurality of haptic sub-signals.

Example haptic conversion algorithms can include: (a) multiplying the audio sub-signal by a pre-determined factor and a sine carrier waveform executed at a haptic output device's resonant frequency; (b) multiplying the audio sub-signal by a pre-determined factor; or (c) shifting a frequency content of the audio sub-signal from a frequency band to another frequency band that surrounds the haptic output device's resonant frequency, and multiplying the shifted audio sub-signal by the original audio sub-signal to preserve the shape of the original audio sub-signal. Examples of frequency shifting algorithms are further described in conjunction with FIG. 5.

The haptic sub-signals are subsequently mixed into a haptic signal using haptic mixer 460. Haptic mixer 460 can mix the haptic sub-signals according to one of a number of mixing techniques. Example mixing techniques are further described in conjunction with FIG. 6.

In certain embodiments, the haptic signal can be normalized to 1 using its maximum absolute value (not illustrated in FIG. 4). In other embodiments, the normalizing can be omitted.

Further, in certain embodiments, one or more "noisy vibrations" can be cleaned from the haptic signal (not illustrated in FIG. 4). A "noisy vibration" is a segment of a haptic signal that includes a deviation from a pre-defined value, where the deviation is below a pre-defined threshold. This segment can be identified as "noise," and can be removed from the haptic signal. This can cause the haptic signal to produce a "cleaner" (i.e., more adequate and compelling) haptic effect, when sent to a haptic output device.

Different techniques can be used to clean the haptic track from one or more "noisy vibrations" that can be identified as "noise." One technique takes a plurality of "chunks" or "windows" of samples from the haptic signal, calculates an average absolute value (or a maximum absolute value in another implementation) of these samples, and identifies the samples as "noise" if the calculated value for the sample is lower than a pre-defined threshold. All the samples identified as "noise" will then have their value reduced to 0. Another technique uses interleaving time windows. For each time window, normalized values of the haptic signal are checked within two larger time windows: (a) the time window itself and the preceding time window; and (b) the time window itself and the succeeding time window. If in these two time windows, the average normalized absolute value (or the maximum normalized absolute value in another implementation) is lower than a pre-defined threshold, the content in the time window is identified as "noise," and its value is reduced to 0. In other embodiments, the cleaning of the one or more noisy vibrations from the haptic signal can be omitted.

Subsequently, the haptic signal is sent to a device 470, where device 470 is configured to generate and output one or more haptic effects based on the received haptic signal. Device 470 is further configured to receive an input signal from multimedia file 410, where the input signal can be an audio signal, a video signal, a signal that contains both audio data and video data, or some other type of input signal. Device 470 can be further configured to generate and output one or more effects, such as audio effects, video effects, or other type of effects, based on the input signal. Further, device 470 can be further configured to generate the one or more haptic effects so that they "complement" the audio effects, video effects, or other type of effects. Device 470 can play different haptic effects and/or signals simultaneously given its configuration (i.e., number and position of haptic output devices).

Figure 5:
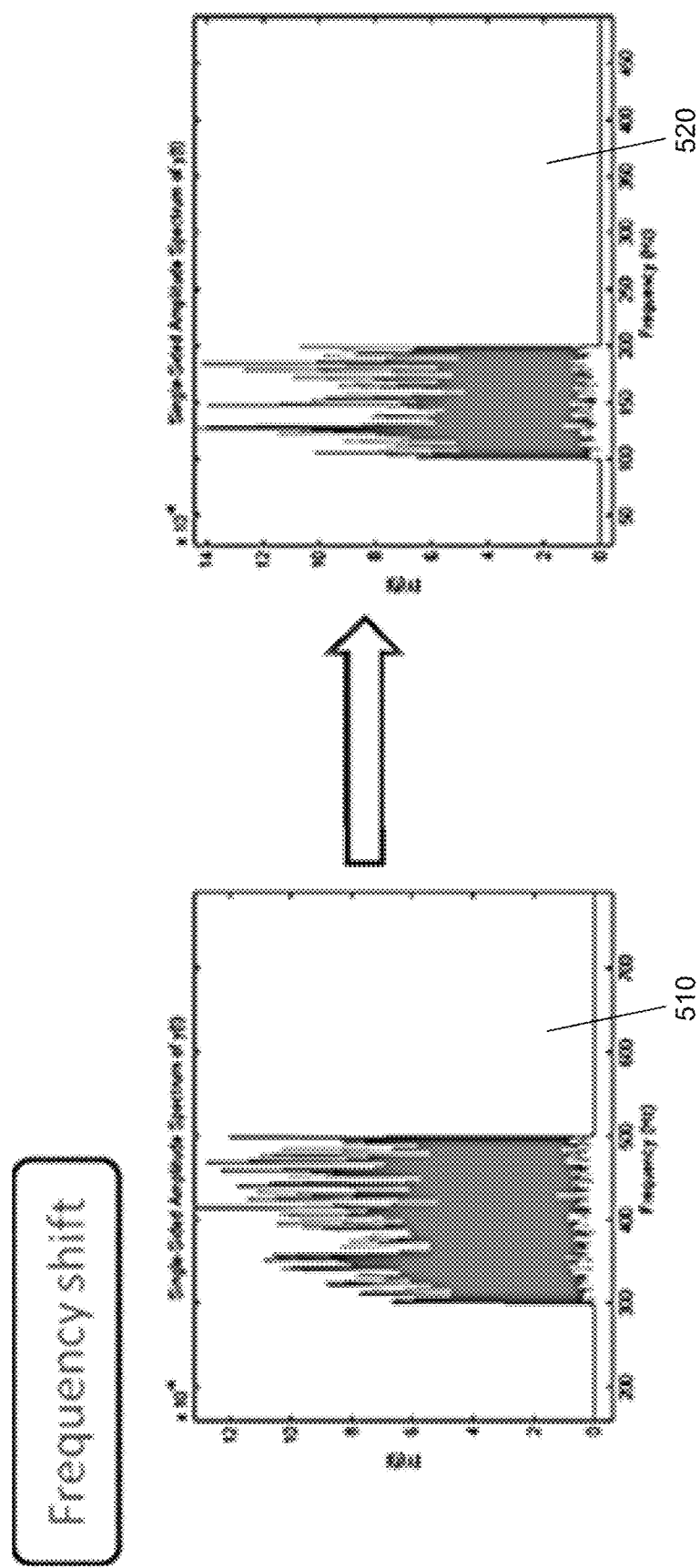
FIG. 5 illustrates an example of shifting a frequency of an input signal, according to an embodiment of the invention.

FIG. 5 illustrates an example of shifting a frequency of an input signal, according to an embodiment of the invention. As previously describes, a haptic conversion algorithm can convert an input signal into a haptic signal by shifting a frequency content of the input signal from a frequency band to another frequency band that surrounds a haptic output device's resonant frequency, and by eventually multiplying the shifted input signal by the original input signal to preserve the shape of the original input signal. In the example illustrated in FIG. 5, an input signal 510 is frequency-shifted into a haptic signal 520. More specifically, input signal 510 includes frequency content within a frequency band of 300 Hz to 500 Hz. However, when input signal 510 is frequency-shifted into haptic signal 520, the frequency content of input signal is shifted from the frequency band of 300 Hz to 500 Hz to a frequency band of 100 Hz to 200 Hz. Thus, haptic signal 520 includes frequency content within the frequency band of 100 Hz to 200 Hz.

In certain embodiments, the frequency-shifting is achieved using a fast Fourier transform of input signal 510. Further, one of multiple frequency-shifting techniques can be used, depending on the sizes of a "shift-from" frequency band (e.g., an original frequency band of input signal 510) and a "shift-to" frequency band (e.g., a shifted frequency band of haptic signal 520). This is because, depending on the sizes of the shift-from frequency band and the shift-to frequency band, either multiple frequencies within the shift-from frequency band are replaced with a single frequency within the shift-to frequency band, or a single band within the shift-from frequency band is replaced with multiple frequencies within the shift-to frequency band.

In scenarios where a shift-from frequency band is larger than a shift-to frequency band, each frequency of the shift-to frequency band represents multiple frequencies of the shift-from frequency band. To accomplish this, one of three frequency-shifting techniques can be used, according to certain embodiments. The first frequency-shifting technique is to average the fast Fourier transform values of the multiple frequencies of the shift-from frequency band, and to assign the average to the corresponding frequency of the shift-to frequency band. The second frequency-shifting technique is to sum the fast Fourier transform values of the multiple frequencies of the shift-from frequency band, and to assign the sum to the corresponding frequency of the shift-to frequency band. The third frequency-shifting technique is to select a frequency of the shift-from frequency band that has the largest absolute fast Fourier transform value, ignore the other frequencies of the shift-from frequency band, and to assign the largest absolute fast Fourier transform value to the corresponding frequency of the shift-to frequency band.

On the other hand, in scenarios where a shift-to frequency band is larger than a shift-from frequency band, each frequency of the shift-from frequency band is represented by multiple frequencies of the shift-to frequency band. To accomplish this, one of two frequency-shifting techniques can be used. The first frequency-shifting technique is to assign the fast Fourier transform value of the frequency of the shift-from frequency band to the multiple frequencies of the shift-to frequency band. The second frequency-shifting technique is to assign the fast Fourier transform value of the frequency of the shift-from frequency band to a single frequency (e.g., a lowest frequency) of the shift-to frequency band.

Figure 6:
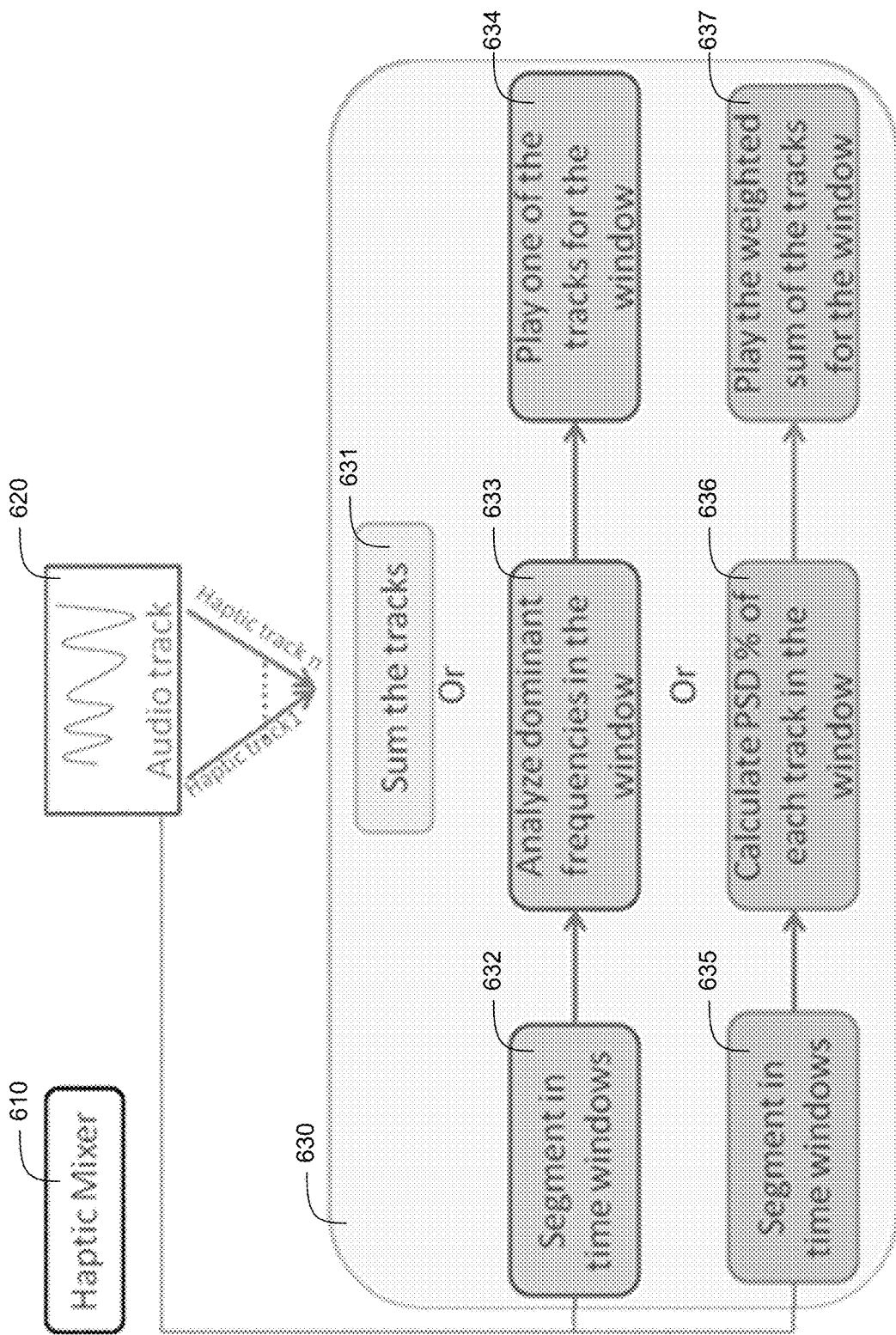
FIG. 6 illustrates a block diagram of a haptic mixer configured to mix a plurality of haptic sub-signals, according to an embodiment of the invention.

FIG. 6 illustrates a block diagram of a haptic mixer 610 configured to mix a plurality of haptic sub-signals, according to an embodiment of the invention. As previously described, an input signal, such as audio signal 620, can be converted into a plurality of haptic sub-signals (illustrated in FIG. 6 as haptic tracks), where haptic mixer 610 can mix the haptic sub-signals into a haptic signal. Haptic mixer 610 can mix the haptic sub-signals according to one of a number of mixing techniques, where three example mixing techniques are illustrated in FIG. 6 at 630.

According to the first mixing technique, at 631, the haptic sub-signals are summed, and the sum of the haptic sub-signals is used to calculate a haptic signal. In certain embodiments, the haptic signal is subsequently normalized.

According to the second mixing technique, at 632, each haptic sub-signal is segmented into a plurality of time windows. At 633, for each time window, one or more dominant frequencies in the corresponding input signal are identified. For each time window, a power spectrum density ("PSD") value is calculated for each frequency in the original input signal and N frequencies having the highest PSD values are identified as being the "dominant frequencies," where N is any number of frequencies. These N frequencies belong to the different bands represented by the different input sub-signals. At 634, the band having the highest number of frequencies in the group of the N dominant frequencies is identified as the dominant band. Its corresponding haptic sub-signal values are assigned to the resulting output haptic signal at the specific time window.

According to the third mixing technique, at 635, each input sub-signal is segmented into a plurality of time windows. At 636, for each time window, a PSD value is calculated per frequency band, and a PSD percentage contribution is also calculated per frequency band for each input sub-signal. More specifically, for each time window, a PSD value for each input sub-signal is calculated, an overall PSD value for the time window calculated, and a ratio of an input sub-signal PSD value to the overall PSD value is calculated for each input sub-signal. The ratio of the input sub-signal PSD value to the overall PSD value is the PSD percentage contribution for that specific input sub-signal. At 637, for each time window, each haptic sub-signal is weighted according to its corresponding input sub-signal PSD percentage contribution, the weighted haptic sub-signals are summed, and the haptic signal is calculated based on the weighted sum of haptic sub-signals of each time window.

The third mixing technique stems from the fact that the frequency content can change significantly throughout an input sub-signal, and thus, can change significantly through a haptic sub-signal. When haptic sub-signals are added together, each haptic sub-signal is given equal weight. However, this may not take into consideration such situations as when an original input sub-signal had a slight influence on the original input content. By giving a weight related to a PSD percentage contribution, each haptic sub-signal will contribute to the haptic signal similar to its corresponding input sub-signal's contribution to the original input signal. The resulting haptic signal for a specific time window is thus the sum of all the haptic sub-signals, where the haptic sub-signals are each weighted by the contribution of its corresponding input sub-signal to the original input signal for the specific time window.

FIG. 7 illustrates a flow diagram of the functionality of a haptic conversion module (such as haptic conversion module 16 of FIG. 1), according to an embodiment of the invention. The flow begins and proceeds to 710. At 710, an input is received. In certain embodiments, a segment of an input signal can be received. In other embodiments, a multimedia file can be received, and an input signal can be extracted from the multimedia file. In certain embodiments, the input signal can be an audio signal. In other embodiments, the input signal can be a video signal. In other embodiments, the input signal can be an acceleration signal. The flow then proceeds to 720.

At 720, the input is segmented into a plurality of input sub-signals. In certain embodiments, the input can be filtered using one or more filters, where each input sub-signal can include a frequency band. Further, in some of these embodiments, the one or more filters include at least one band-pass filter. The flow then proceeds to 730.

At 730, the input sub-signals are converted into a haptic signal. In certain embodiments, the input sub-signals can be prioritized based on an analysis parameter. One or more input sub-signals can be selected, and the haptic signal can be generated based on the selected input sub-signals. In some of these embodiments, the analysis parameter can include a characteristic of the input sub-signals. Further, the characteristic of the input sub-signals can include one of: a frequency, a duration, an envelope, a density, or a magnitude. Even further, in some of these embodiments, the haptic signal can be warped into a warped haptic signal, where one or more haptic effects can be generated based on the warped haptic signal.

In other embodiments, the input sub-signals can be converted into haptic sub-signals. In some of these embodiments, the input sub-signals can be converted into haptic sub-signals by at least one of: multiplying an input sub-signal by a factor and a sine carrier waveform; multiplying the input sub-signal by a factor; or shifting frequency content from a first frequency band of the input sub-signal to a second frequency band of the input sub-signal. Further, in some of these embodiments, each input sub-signal can be converted into a haptic sub-signal using a unique haptic conversion algorithm. Even further, in some embodiments, a fast Fourier transform of the input sub-signal can be performed.

Furthermore, in embodiments where frequency content is shifted from a first frequency band of the input sub-signal to a second frequency band of the input sub-signal, the shifting can include at least one of: averaging a plurality of fast Fourier transform values for a plurality of frequencies within the first frequency band of the input sub-signal, and assigning the average to a frequency within the second frequency band of the input sub-signal; summing a plurality of fast Fourier transform values for a plurality of frequencies within the first frequency band of the input sub-signal, and assigning the sum to a frequency within the second frequency band of the input sub-signal; selecting a fast Fourier transform value that has a highest absolute value from a plurality of fast Fourier transform values for a plurality of frequencies within the first frequency band of the input sub-signal, and assigning the selected fast Fourier transform value to a frequency within the second frequency band of the input sub-signal; assigning a fast Fourier transform value for a frequency within the first frequency band of the input sub-signal to a plurality of frequencies within the second frequency band of the input sub-signal; or assigning a fast Fourier transform value for a frequency within the first frequency band of the input sub-signal to a lowest frequency within the second frequency band of the input sub-signal.

In certain embodiments, the haptic sub-signals can then be mixed into the haptic signal. In some of these embodiments, the mixing can include one of: summing the plurality of haptic sub-signals into the haptic signal and normalizing the haptic signal; segmenting the input signal into one or more time-windows, analyzing a plurality of frequencies of the plurality of input sub-signals for each time-window, and selecting a haptic sub-signal from the plurality of haptic sub-signals as the haptic signal for each time-window, where the selected haptic sub-signal includes a frequency of the plurality of frequencies; or segmenting the haptic signal into one or more time windows, calculating a power spectrum density percentage contribution for each input sub-signal of the plurality of input sub-signals for each time window, and calculating a weighted combination of the plurality of haptic sub-signals as the haptic signal for each time-window, where a weight of each haptic sub-signal is based on the power spectrum density percentage contribution of the corresponding input sub-signal.

In certain embodiments, the haptic signal can be normalized to 1 using its maximum absolute value. Further, in certain embodiments, one or more noisy vibrations can be cleaned from the haptic signal. In some of these embodiments, one or more sample haptic sub-signals can be selected from the haptic signal. A mean absolute value can be calculated for each selected sample haptic sub-signal of the one or more selected sample haptic sub-signals. Each mean absolute value can be compared with a threshold. A sample haptic sub-signal can be removed from the haptic signal when its corresponding mean absolute value is less than the threshold. The flow then proceeds to 740.

At 740, one or more haptic effects are generated based on the haptic signal. In some embodiments, the haptic signal can be sent to a haptic output device to generate the one or more haptic effects. In some of these embodiments, the haptic output device can be an actuator. The flow then ends.

Thus, in one embodiment, a system can filter an input into one or more frequency bands, analyze and prioritize the one or more frequency bands based on one or more pre-determined analysis parameters, select at least one of the frequency bands based on the prioritization, and can use the selected frequency band(s) to generate a haptic signal that is ultimately used to generate one or more haptic effects. By analyzing multiple frequency bands of an input and selecting one or more frequency bands based on a prioritization, an opportunity is given for the entire input to come through in the haptic signal. More specifically, an entire frequency spectrum of the input can be encompassed, and one or more specific frequency bands can be selected, such as one or more frequency bands that are mostly in the foreground from the perspective of the user. This can lead to a haptic effect that is more "customized" to the input, rather than merely selecting a frequency band of the input without first analyzing the multiple frequency bands of the input. By filtering the input and prioritizing the multiple frequency bands of the input, the system can further "perfect" the haptic effect that can be generated to "complement" the input. Further, such a solution can be an elegant solution that can be extended by future haptic conversion algorithms.

Further, in another embodiment, a system can filter an input into one or more frequency bands, convert each frequency band into a haptic sub-signal, and mix the haptic sub-signals into a haptic signal that is ultimate used to generate one or more haptic effects. The system can create a compelling haptic effect that "complements" the input without the need of any human intervention, such as authored effects. Such a system can be implemented on any mobile device, such as a tablet or smartphone, and can use the processing power of the device as well as a haptic playback component of the device to deliver a richer experience, such as a richer video viewing experience or richer music listening experience). Further, unlike previous solutions, the system can attempt to create a haptic signal based on all of the input, rather than a specific segment of the input, such as a low frequency content of the input. As previously described, this can be accomplished by regrouping the content of the input given the existing frequencies, and processing each group adequately according to the group's frequency profile, and according to the haptic play device. Such an approach can produce a more "perfect" haptic effect that "complements" the input.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to convert an input into one or more haptic effects using segmenting and combining, the converting comprising:

receiving the input;

segmenting the input into input sub-signals, the segmenting comprising filtering the input using one or more filters, wherein each of the input sub-signals comprises a different frequency band that is output from a respective filter;

after the segmenting, prioritizing the input sub-signals based on an analysis parameter, wherein the prioritizing comprises determining for each of the input sub-signals, a value of a characteristic that is defined by the analysis parameter of the input sub-signal, and ordering the input sub-signals based on the determined values;

selecting a subset of the input sub-signals from the input sub-signals based on the prioritizing, wherein the subset is less than the input sub-signals;

calculating a haptic signal based on a combination of the selected subset of input sub-signals, the calculating the haptic signal including:

converting the subset of input sub-signals into haptic sub-signals wherein the converting includes multiplying an input sub-signal by a factor, and summing the haptic sub-signals into the haptic signal and normalizing the haptic signal; and generating the one or more haptic effects based on the haptic signal.

2. The computer-readable medium of claim 1, wherein the one or more filters comprise at least one band-pass filter.

3. The computer-readable medium of claim 1, wherein the receiving the input further comprises receiving a segment of an input signal.

4. The computer-readable medium of claim 3, wherein the analysis parameter comprises a maximum magnitude value for each of the input sub-signals.

5. The computer-readable medium of claim 1,
wherein the characteristic comprises one of: a frequency, a duration, an envelope, a density, or a magnitude.

6. The computer-readable medium of claim 1, the converting further comprising:

warping the haptic signal into a warped haptic signal, the warping based on a type of haptic output device that is configured to play the warped haptic signal;

wherein the generating the one or more haptic effects further comprises generating the one or more haptic effects based on the warped haptic signal.

7. The computer-readable medium of claim 1, wherein the receiving the input further comprises:

receiving a multimedia file; and extracting an input signal from the multimedia file.

8. The computer-readable medium of claim 1, wherein the converting the subset of input sub-signals into haptic sub-signals further comprises at least one of:

multiplying an input sub-signal by a factor and a sine carrier waveform;

multiplying the input sub-signal by a factor; or shifting frequency content from a first frequency band of the input sub-signal to a second frequency band of the input sub-signal.

9. The computer-readable medium of claim 8 wherein each of the input sub-signals is converted into a haptic sub-signal using a unique haptic conversion algorithm.

10. The computer-readable medium of claim 8, wherein the shifting the frequency content from the first frequency band of the input sub-signal to the second frequency band of the input sub-signal further comprises performing a fast Fourier transform of the input sub-signal.

11. The computer-readable medium of claim 10, wherein the shifting the frequency content from the first frequency band of the input sub-signal to the second frequency band of the input sub-signal further comprises at least one of:
  averaging fast Fourier transform values for frequencies within the first frequency band of the input sub-signal, and assigning the average to a frequency within the second frequency band of the input sub-signal;
  summing fast Fourier transform values for frequencies within the first frequency band of the input sub-signal, and assigning the sum to a frequency within the second frequency band of the input sub-signal;
  selecting a fast Fourier transform value that has a highest absolute value from fast Fourier transform values for frequencies within the first frequency band of the input sub-signal, and assigning the selected fast Fourier transform value to a frequency within the second frequency band of the input sub-signal;
  assigning a fast Fourier transform value for a frequency within the first frequency band of the input sub-signal to frequencies within the second frequency band of the input sub-signal; or
  assigning a fast Fourier transform value for a frequency within the first frequency band of the input sub-signal to a lowest frequency within the second frequency band of the input sub-signal.

12. The computer-readable medium of claim 1, wherein the summing of the haptic sub-signals into the haptic signal comprises at least one of:
  segmenting the haptic signal into one or more time-windows, analyzing frequencies of the haptic sub-signals for each time-window, and selecting a haptic sub-signal from the haptic sub-signals as the haptic signal for each time-window, wherein the selected haptic sub-signal comprises a frequency of the frequencies; or
  segmenting the input signal into one or more time windows, calculating a power spectrum density percentage contribution for each of the input sub-signals of the input sub-signals for each time window, and calculating a weighted combination of the corresponding haptic sub-signals as the haptic signal for each time-window, wherein a weight of each haptic sub-signal is based on the power spectrum density percentage contribution of each corresponding input sub-signal.

13. The computer-readable medium of claim 1, the converting further comprising:
  normalizing the haptic signal to 1 using its maximum absolute value.

14. The computer-readable medium of claim 1, the converting further comprising:
  cleaning one or more noisy vibrations from the haptic signal.

15. The computer-readable medium of claim 14, wherein the cleaning the one or more noisy vibrations from the haptic signal further comprises:
  selecting one or more sample haptic sub-signals from the haptic signal;
  calculating a mean absolute value for each selected sample haptic sub-signal of the one or more selected sample haptic sub-signals;
  comparing each mean absolute value with a threshold; and
  removing a sample haptic sub-signal from the haptic signal when its corresponding mean absolute value is less than the threshold.

16. The computer-readable medium of claim 1, wherein the generating the one or more haptic effects further comprising sending the haptic signal to a haptic output device to generate the one or more haptic effects.

17. The computer-readable medium of claim 16, wherein the haptic output device comprises an actuator.

18. The computer-readable medium of claim 1, wherein the input comprises one of an audio signal, a video signal, or an acceleration signal.

19. A computer-implemented method for converting an input into one or more haptic effects using segmenting and combining, the computer-implemented method comprising:
  receiving the input;
  segmenting by a processor the input into input sub-signals, the segmenting comprising filtering the input using one or more filters, wherein each of the input sub-signals comprises a different frequency band that is output from a respective filter;
  after the segmenting, prioritizing by the processor the input sub-signals based on an analysis parameter, wherein the prioritizing comprises determining for each of the input sub-signals, a value of a characteristic that is defined by the analysis parameter of the input sub-signal, and ordering the input sub-signals based on the determined values;
  selecting by the processor a subset of the input sub-signals from the input sub-signals based on the prioritizing, wherein the subset is less than the input sub-signals;
  calculating a haptic signal based on a combination of the selected subset of input sub-signals, the calculating the haptic signal including:
    converting the subset of input sub-signals into haptic sub-signals wherein the converting includes multiplying an input sub-signal by a factor, and
    summing the haptic sub-signals into the haptic signal and normalizing the haptic signal; and
  generating the one or more haptic effects based on the haptic signal.

20. The computer-implemented method of claim 19, wherein the analysis parameter comprises a maximum magnitude value for each of the input sub-signals.

21. The computer-implemented method of claim 19, wherein the receiving the input further comprises:
  receiving a multimedia file; and
  extracting an input signal from the multimedia file.

22. A system for converting an input into one or more haptic effects using segmenting and combining, the system comprising:
  a memory configured to store a haptic conversion module; and
  a processor configured to execute the haptic conversion module stored on the memory;
  wherein the haptic conversion module is configured to receive the input;
  wherein the haptic conversion module is further configured to segment the input into input sub-signals, the segmenting comprising filtering the input using one or more filters, wherein each of the input sub-signals comprises a different frequency band that is output from a respective filter;
  wherein the haptic conversion module is further configured to, after the segmenting, prioritize the input sub-signals based on an analysis parameter, wherein the prioritize comprises determining for each of the input sub-signals, a value of a characteristic that is defined by the analysis parameter of the input sub-signal, and ordering the input sub-signals based on the determined values;

wherein the haptic conversion module is further configured to select a subset of the input sub-signals from the input sub-signals based on the prioritizing, wherein the subset is less than the input sub-signals;

wherein the haptic conversion module is further configured to calculate a haptic signal based on a combination of the selected subset of input sub-signals, the calculating the haptic signal including:

converting the subset of input sub-signals into haptic sub-signals wherein the converting includes multiplying an input sub-signal by a factor, and summing the haptic sub-signals into the haptic signal and normalizing the haptic signal; and wherein the haptic conversion module is further configured to generate the one or more haptic effects based on the haptic signal.

23. The system of claim 22, wherein the analysis parameter comprises a maximum magnitude value for each of the input sub-signals.

24. The system of claim 22, wherein the haptic conversion module is further configured to receive a multimedia file; and wherein the haptic conversion module is further configured to extract an input signal from the multimedia file.

25. The computer-implemented method of claim 19, wherein the generating the one or more haptic effects further comprises sending the haptic signal to a haptic output device.

26. The system of claim 22, wherein the one or more haptic effects is generated by sending the haptic signal to a haptic output device.

27. The computer-implemented method of claim 21, wherein the mixing the haptic sub-signals into the haptic signal comprises at least one of:

segmenting the haptic signal into one or more time-windows, analyzing frequencies of the haptic sub-signals for each time-window, and selecting a haptic sub-signal from the haptic sub-signals as the haptic signal for each time-window, wherein the selected haptic sub-signal comprises a frequency of the frequencies; or segmenting the input signal into one or more time windows, calculating a power spectrum density percentage contribution for each of the input sub-signals of the input sub-signals for each time window, and calculating a weighted combination of the corresponding haptic sub-signals as the haptic signal for each time-window, wherein a weight of each haptic sub-signal is based on the power spectrum density percentage contribution of each corresponding input sub-signal.

* * * * *